(12) United States Patent
Trotta et al.

(10) Patent No.: US 12,445,281 B2
(45) Date of Patent: *Oct. 14, 2025

(54) DYNAMIC, CONTROL-SENSITIVE DATA MANAGEMENT PLATFORM

(71) Applicant: Citibank, N.A., New York, NY (US)

(72) Inventors: Walter Trotta, Cranford, NJ (US);
Vaibhav Kumar, Monroe, NJ (US);
Samuel J. Kass, Oberrieden (CH);
Sasisekar Shanmugasundaram, Warsaw (PL)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/200,398

(22) Filed: May 6, 2025

(65) Prior Publication Data
US 2025/0266995 A1      Aug. 21, 2025

Related U.S. Application Data

(63) Continuation of application No. 18/818,560, filed on Aug. 28, 2024, now Pat. No. 12,341,884, which is a continuation-in-part of application No. 18/134,883, filed on Apr. 14, 2023, now Pat. No. 12,277,243.

(51) Int. Cl.
*G06F 21/00*    (2013.01)
*G06F 21/62*    (2013.01)
*H04L 9/08*     (2006.01)

(52) U.S. Cl.
CPC ................. *H04L 9/088* (2013.01)

(58) Field of Classification Search
CPC .............. G06F 21/6218; G06F 21/6227
See application file for complete search history.

(56) References Cited

U.S. PATENT DOCUMENTS

| | | | |
|---|---|---|---|
| 2021/0152542 A1* | 5/2021 | Gimenez Palop | G06F 21/45 |
| 2022/0179986 A1 | 6/2022 | Veeramachaneni et al. | |
| 2022/0407702 A1* | 12/2022 | Jakobsson | H04L 9/50 |
| 2023/0006976 A1* | 1/2023 | Jakobsson | H04L 9/50 |
| 2023/0195932 A1 | 6/2023 | Carnesecca et al. | |
| 2023/0222137 A1* | 7/2023 | Aucinas | H04L 63/20 |
| | | | 707/802 |

OTHER PUBLICATIONS

Office Action Non-Final issued May 21, 2025, in U.S. Appl. No. 19/094,636 (7 pages).

* cited by examiner

*Primary Examiner* — Phy Anh T Vu
(74) *Attorney, Agent, or Firm* — Perkins Coie LLP (57) ABSTRACT

A network system to allow global usage of data while allowing regional jurisdictions control over sensitive data. Different jurisdictions may declare different types of data as sensitive data that is not to be discoverable by another party. The system may receive data that includes encoded data at a first device from a second device (e.g., associated with a remote datacenter). The system may store the data at the first device. In response to receiving a request from a third entity, the system may request a cryptographic key for decoding one or more data fields of the encoded data. Based on decoding the associated field data, the system may transmit a response to the data request that includes the decoded data.

18 Claims, 5 Drawing Sheets

DYNAMIC, CONTROL-SENSITIVE DATA MANAGEMENT PLATFORM

CROSS-REFERENCE TO RELATED APPLICATIONS

This application is a continuation of U.S. patent application Ser. No. 18/818,560, filed Aug. 28, 2024, which is a continuation-in-part of U.S. patent application Ser. No. 18/134,883 filed Apr. 14, 2023. The content of the foregoing application is incorporated herein in its entirety by reference.

SUMMARY

As the digital age progresses, so does the significance of controlling data access, to ensure privacy, confidentiality, and security of the plethora of stored and transmitted data. For example, various entities may have different data storage and retention practices and requirements. As such, different data stored within a given system may be associated with different policies, restrictions, or requirements that prevent the data to be distributed, accessed, or stored. To illustrate, a data storage device may need to store data with elements that are only allowed to be stored in certain locations or jurisdictions such that the storage device is outside of that location or jurisdiction. For example, certain data may originate from a location or a jurisdiction that does not allow some types of data to be stored outside of that location or jurisdiction. However, an entity may have various reasons to store that data outside the location of jurisdiction.

In pre-existing data access systems, a first data storage device may only receive information from a second device (e.g., an administrator system or server) that is allowed to be accessed by the first device. For example, receipt of information that includes confidential information (e.g., user credential information associated with a user account on the administrator server) may be forbidden at the first device. As such, at a given point in time, the first device associated with pre-existing data management systems may only store data that is allowed to be accessible to the device. While such pre-existing data management systems enable the implementation of access controls on sensitive data, such systems may not effectively handle changes to access controls over time (e.g., due to changing credentials associated with the first device and/or changing policies, rules, or regulations). For example, due to changing credentials associated with the first device, a portion of a given dataset that was originally restricted from access for the first device may be accessible at another point in time. In order to access this data, the device may need to transmit a request to the second device (e.g., the administrator system) for access to the relevant data. In response, the administrator system may transmit the whole dataset or the portion of the dataset, thereby introducing a delay for the first device in receiving access to such data.

Moreover, pre-existing data management systems lack an effective strategy for handling situations where particular access to particular data (e.g., for the first device) is subsequently restricted or rescinded. To illustrate, once data is sent to the first device, a change in administrator system policies and/or due to a change in credentials associated with the first device could cause a subsequent change in the sharing policies or procedures associated with the shared data, thereby causing the first device to lose permissions to such data. Pre-existing systems may not have a suitable mechanism for causing the first device to subsequently lose access to this data (e.g., by erasure). As such, pre-existing systems do not effectively handle changes in access permissions, thereby leading to potential security vulnerabilities and harming access control enforcement.

Furthermore, pre-existing systems fail to effectively manage data that includes a combination of sensitive (e.g., forbidden) and non-sensitive (e.g., permitted) data. For example, where a particular column of a tabular data structure is forbidden for transmission to the first device, the administrator system in a pre-existing data management system may prevent transfer of the entire data structure, thereby depriving the first device of even non-sensitive columns within the data structure. Alternatively, the administrator system may cause transfer of only permitted portions of the data structure, while omitting forbidden columns. In such cases, while the first device may manipulate, modify, or utilize the underlying data, such data's relationship with the forbidden, sensitive portions of the data structure is lost. For example, the first device may manipulate the rows of accessible, non-sensitive data. In the case of gaining access to the columns of sensitive data at a subsequent time (e.g., due to a change in data storage regulations), the first device does not retain the relationship between the rows of the manipulated data and the entries associated with the columns of sensitive data. As such, pre-existing systems may struggle to enable devices or systems to handle data associated with dynamically changing access controls.

The data management system disclosed herein enables the secure receipt and handling of sensitive and non-sensitive data at a first device, as controlled by a second device, in a manner that preserves and strengthens the security, privacy, and confidentiality of such data in a dynamic, adaptable fashion. For example, the data management system may be enabled to destroy data or access to data based on a remote command. The data being destroyed may be a portion of the data (e.g., including certain fields or entries). For example, data associated with a particular user may be destroyed or access to that data may be disabled. Furthermore, a particular type of data may be destroyed (e.g., personally identified able information)

In some embodiments, the data management system may enable the first device to obtain a dataset. The dataset may include a combination of non-sensitive data, to which the first device is permitted access, and sensitive data, to which the first device is prohibited access. For example, the non-sensitive data may include information relating to account characteristics, settings, and/or other suitable information. In contrast, the sensitive data may include information relating to user credentials and/or private information associated with the user (e.g., sensitive user identification numbers or other such information). The sensitive data may be encoded into tokens that are not readable to the first device when the data is stored. In some embodiments, the tokens may be stored within the fields instead of the sensitive data.

In some embodiments, the data management system may receive a request for at least a portion of the sensitive data from a requesting device. The requesting device may be located within the same location or jurisdiction as the device that received the data having tokens and stored that data. In response to the request, the data management system may provide access to portions of the sensitive data for the first device. For example, the first device may request and receive a decoding function and associated cryptographic key from the first administrator system, thereby enabling the first device to decode the encoded sensitive data accordingly. Accordingly, the first device may transmit the requested data to the second administrator system in response to the request, thereby completing the request by the second administrator system without requiring a re-transmission of the sensitive data from the first authentication system to the first device.

As such, the data management system disclosed herein enables resilient, adaptable modification of access controls associated with sensitive and non-sensitive data. For example, the data management system enables the first device to retain an encoded, inaccessible version of the sensitive data. When such data becomes accessible to the first device (e.g., due to changes in data access controls, regulations, or credentials), the data management system enables efficient, immediate access to the newly accessible data by enabling the first device to receive a cryptographic key from the second device (e.g., the administrator system) to enable decoding of the retained sensitive data. As such, the first device may immediately access, view, and manipulate previously confidential information without waiting to receive such data in bulk in response to such changes (e.g., via a transmission from the second device).

In some embodiments, the data management system enables the first device to lose access to previously accessible (e.g., non-sensitive data). For example, the first device may receive a one-way hash function from the second device, along with a request to disable access to specific data fields (e.g., columns) of the non-sensitive, accessible data within the first device. To illustrate, such a request may be in conjunction with changing access permissions (e.g., due to a change in authentication level for the first device and/or a change in access control policies associated with the system in the location or jurisdiction where the data originated). In response to the request, the first device may execute the hash function with respect to the requested data fields. Thus, the data management system disclosed herein enables more efficient adaptability and resilience associated with dynamically changing data access controls and configurations.

In some aspects, the data management system may, at a first device, receive a combination of encoded, sensitive data and accessible, non-sensitive data (e.g., from a second device or a first administrator device of a user account management system). For example, the data management system may receive data that includes a plurality of data fields. The plurality of data fields may include a first set of fields encoded into a corresponding token representing corresponding field data and a second set of fields not encoded into the corresponding token. As an illustrative example, the data management system may receive a tabular data structure that includes sensitive and non-sensitive user account information. The non-sensitive information may include columns of data associated with unprotected information, where each row is associated with a corresponding user of the user account system. For example, the non-sensitive information may include, account types, or access permissions associated with each user in each row of the data structure. The sensitive information may include columns of data associated with protected information, where each row is associated with the same corresponding user. The protected information may include user credential information (e.g., passwords), personal information (e.g., birthdates or identifiable information), or other suitable data, where such data has been encoded into an unreadable format for the first device. For example, the administrator device may encrypt such information using a pre-determined or dynamically selected cryptographic function and transmit the tabular data structure where sensitive elements (e.g., columns or elements thereof) have been encrypted using the function. As such, the first device may receive a dataset that has a combination of encoded, inaccessible data and un-encoded, accessible data.

Furthermore, the data management system may receive a request (e.g., from another device at the first device) for data that is, at least in part, sensitive, from the first device. For example, the data management system may receive a data request that includes a request for a data field from the first set of fields encoded into the corresponding token. As an illustrative example, the data management system may receive a request for a particular column (e.g., using a column number or a tag that identifies the requested column) of the received data structure that partially or fully includes sensitive information, such as a request for passwords or other user credentials of the users of the user account management system. By receiving such a request, the data management system enables the first device to relay information, if allowed, to other devices in response to requests, even if such information is initially sensitive and inaccessible.

To gain access, the data management system may request a cryptographic key for decoding the sensitive data (e.g., from the administrator device controlling access to such data). For example, the data management system may request a cryptographic key for decoding the data field. As an illustrative example, the data management system requests a key (e.g., an alphanumeric and/or hexadecimal token) and/or an associated cryptographic function (e.g., a symmetric or asymmetric key algorithm) from a system controlling access permissions to the sensitive, encoded data. For example, the key may include a token that, when provided to the cryptographic function, enables decoding of information encoded using the same function. In some implementations, the request for the key may include contextual information associated with the request for data (e.g., a device indicator of the device requesting sensitive data). By requesting such information, the data management system, via the first device, may request a modification to access permissions in response to the request from the other device (e.g., another administrator system), thereby enabling dynamic changes to access control permissions.

Thus, the data management system may decode the field data within the data field using a cryptographic key provided in response to the request for the cryptographic key. For example, the data management system may decode field data within the data field using the cryptographic key into a decoded data field. As an illustrative example, the data management system (e.g., via the first device) may apply a cryptographic key received from the administrator system that originally provided the sensitive data to the encoded data (e.g., the encoded column associated with user credentials within the data structure). By applying the cryptographic key to the encoded (e.g., previously encrypted) data, the data management system enables the first device to decode and, therefore, access the underlying data. To illustrate, the first device may generate a column that represents the unprotected user credentials (e.g., user passwords) associated with the user accounts of the account management system associated with the administrator system. As such, the first device may subsequently process, manipulate, or transmit this unprotected, accessible data as desired.

The data management system may then transmit the decoded data to the suitable entity. For example, the system may transmit a response to the data request that includes the decoded data field. As an illustrative example, the first device may transmit the column of unprotected (e.g., readable) user credentials to the other device, in response to the other device's request. By doing so, the first device may satisfy the request of the other device, while maintaining any access control restrictions imposed by the administrator system.

In some embodiments, the data management system may receive a command to disable access to a given field in response to a request to do so (e.g., by the administrator system). For example, the system may receive a command to encode a field of the second set of fields not encoded into the corresponding token. The system may determine a new cryptographic key for encoding the field of the second set of fields. The system may encode value data within the field of the second set of fields into one or more new tokens, wherein the one or more new tokens are decoded based on the new cryptographic key. The system may replace the value data with the one or more new tokens. As an illustrative example, the first device may receive a request (e.g., from the administrator system) to disable the first device's access to another column within the stored data structure (e.g., associated with the username), such as in response to changing regulations or policies with respect to the access permissions of the first device with respect to the associated column. As such, the first device may obtain a cryptographic key (e.g., from the administrator system) for encoding the data within the hitherto accessible column, in order to render the data inaccessible to the first device, thereby protecting the data in a dynamic fashion. As such, the data management system disclosed herein enables adaptable, resilient provision or revocation of access to specific data within a dataset on the basis of changing access control restrictions, requirements, or regulations, thereby conferring improved flexibility, control, and adaptability over pre-existing systems.

In some embodiments, the data management system may use a tokenization service that may tokenize and detokenize specific data. To disable access to the data, the data management system may remove permissions from a particular application and/or a particular computing device to access the tokenization service (e.g., via certificate revocation, application blocking, or via another mechanism.)

DETAILED DESCRIPTION

The disclosed data management system enables the dynamic, adaptable management of data subject to changing access control restrictions (e.g., associated with sensitive data and/or non-sensitive data). For example, the disclosed data management system enables a first jurisdiction computing system (e.g., a first device) to receive data that includes a combination of un-encoded non-sensitive data and encoded sensitive data from a remote datacenter (e.g., a second device) for efficient, immediate retrieval and access to both sensitive and non-sensitive data when access control restrictions change (e.g., in response to changing jurisdiction regulations, policies, or other such factors).

In some embodiments, the data management system may receive data (e.g., through a communications network) that includes sensitive data that is unreadable at the receiving device (e.g., encrypted), as well as non-sensitive data that is accessible to the receiving device (e.g., not encrypted). For example, the data management system may receive data. The data may include a plurality of data fields. The plurality of data fields may include a first set of fields encoded into a corresponding token representing corresponding field data and a second set of fields not encoded into the corresponding token. As an illustrative example, the data management system, at a first device associated with a first jurisdiction, may receive a tabular data structure that includes a set of columns (e.g., fields) that are accessible to the system (e.g., in a readable format), as well as a set of columns that are not accessible the system (e.g., encrypted as a token). In some embodiments, the data management system may receive the data at a first device from a second device (e.g., a remote datacenter in a second jurisdiction different from the first jurisdiction). By doing so, the data management system may store, manipulate, and access data to which the first device is permitted access, while retaining a representation of inaccessible data for efficient decoding and retrieval in case of changing access permissions.

As an illustrative example, the data management system (e.g., at a second device associated with a remote datacenter) may obtain, receive, or extract data (e.g., a dataset) that includes a set of fields. For example, the data management system may store data within a jurisdiction storage system associated with the second device (e.g., a "second jurisdiction storage system"). A field may include an indication of an element of a dataset, such as a column, row, or element of a tabular data structure. For example, field data may include a value associated with a particular data field (e.g., an array or vector representing a column within a tabular dataset). In some implementations, a field may be associated with metadata characterizing the information therein. Such metadata may include a tag (e.g., a label), information relating to its source or origin, and/or information relating to access controls. For example, access controls may include information, criteria, or conditions relating to access to a particular field. For example, access controls associated with a particular field of a dataset may include information characterizing the jurisdictions with which a device must be associated to be allowed access to the underlying data. An access control may specify that personal identifiable information (PII) may not be shared between particular jurisdictions. Additionally or alternatively, access controls associated with a field may include information characterizing device credentials (e.g., an authentication level) required for access to the field data. In some implementations, metadata associated with the field includes information associated with a cryptographic key and/or associated cryptographic function for protecting the associated data (e.g., as stored on other devices).

In some embodiments, the system may receive a command to disable access to the first set of fields encoded into the corresponding token representing the corresponding field data. The first set of fields corresponds to parameters associated with a user. For example, a particular operator of a jurisdiction that control the access to the data may want to prevent access to data fields associated with a particular user (e.g., a person of interest). Accordingly, the operator may select certain fields within the data to retokenize such that those fields (as described above) so that those fields are not being able to be accessed. These steps may prevent access to data temporarily or permanently.

In some embodiments, the system may erase, for each field within the first set of fields a corresponding function identifier of a cryptographic decoding function and a corresponding key identifier of the cryptographic key. That is, the system may take these actions to prevent access to the data permanently, as the system would no longer be able to identify a function needed to decode/detokenize the fields.

In some embodiments, the data management system may tokenize portions of a dataset. For example, the second device, associated with a remote datacenter, may generate tokens associated with a datacenter. As discussed below, a token may include a non-sensitive representation of sensitive data. For example, a token may include a result of a mathematically reversible cryptographic function with a corresponding key. For example, a token may include encrypted tokens, as associated with cryptographic functions such as the Advanced Encryption Standard (AES) or the Rivest-Shamir-Adleman (RSA) algorithms. Additionally or alternatively, a token may include digital signatures (or tokens generated with public or private keys) associated with asymmetric cryptographic functions, such as an Elliptic Curve Digital Signature Algorithm (ECDSA) or Digital Signature Algorithm (DSA). Additionally or alternatively, a token may include a value generated using a hash function, an index function, or a randomly generated number. For example, the data management system (e.g., at a second device) may generate tokens representing field data of the dataset. A token may be generated from unencoded data using a cryptographic key (e.g., an encoder key). Additionally or alternatively, a unencoded data may be generated from token using a cryptographic key (e.g., a decoder key).

In some embodiments, the data management system (e.g., at the second device associated with a second jurisdiction) may determine fields of a given dataset to tokenize based on information associated with the first device, to which the associated data is to be transmitted. For example, the data management system may determine that the first device is associated with the first jurisdiction. The data management system may determine to tokenize field data for fields that correspond to particular access controls, where the particular access controls specify that the corresponding field data is to be tokenized prior to transmission to devices of the first jurisdiction. In some implementations, the data management system may determine to tokenize the corresponding field data according to a particular cryptographic function and using a particular cryptographic key, as determined by metadata associated with the given field and/or the given access controls. In some embodiments, the data management system may generate the associated tokenized data for transmission to another device (e.g., the first device). As such, the first device may receive data, some fields of which are tokenized at the second device (e.g., the remote datacenter) according to suitable access controls (e.g., regulations, policies, or requirements).

The data management system may store the data (e.g., as received from the second device) within an associated storage device. In some embodiments, the data management system stores metadata associated with the corresponding fields, including tags or labels associated with the fields. For example, the data management system may store the data within a jurisdiction storage system associated with the first device (e.g., a "first jurisdiction storage system"). For example, the data management system may store unencoded and encoded field data within a memory device within the first jurisdiction associated with the first device. By doing so, the data management system enables efficient retrieval, processing, and/or transmission of the received information at the first device, including in situations where encoded data is allowed to be decoded (e.g., in response to changing access control requirements as determined at the remote datacenter).

In some embodiments, the data management system may receive a data request (e.g., from a third device, such as a third-party computing device). For example, the data management system may receive a data request. The data request may include a request for a data field from the first set of fields encoded into the corresponding token. As an illustrative example, the data management system may receive, at the first device and from a third device (e.g., a second remote datacenter), a request for particular data that includes tokenized data received from the second device (e.g., the first remote datacenter). The particular data may include a request for one or more data fields (including encoded and/or unencoded data). The third device may include another device that is communicably linked to the first device (and/or the second device), such as through a communications network, as shown below in FIG. 1. The request may include a request for data corresponding to one or more particular fields (e.g., identifiers of particular columns of the data stored within the first jurisdiction storage system). The request may include tags associated with metadata to identify the particular fields. In some embodiments, the request may include a column identifier (e.g., a column number) or a field identifier (e.g., a label, as in a markup language file). By receiving such a request from a third party (e.g., the second remote datacenter), the first device is configured to handle data transfer requests on behalf of the other datacenter (e.g., the first remote datacenter), such as by acting as a local node or proxy for the third party. To illustrate, communications between the first device and the third party may be more efficient (e.g., with a lower latency) than communications between the third party and the second device, such as due to network limitations. As such, the third party may request information from the first device to improve the efficiency of data management associated with the system.

In some embodiments, the data management system (e.g., via the first device) may request a cryptographic key for decoding the data field (e.g., from the second device). For example, the data management system may request a cryptographic key for decoding the data field. As an illustrative example, the data management system may request information relating to a mechanism for decoding the tokenized data from the second device (e.g., the first remote datacenter associated with the second jurisdiction), in response to the request from the third entity. To illustrate, the first device may transmit a request that includes information and/or credentials associated with the third device, as well as the nature of the requested data to be tokenized (e.g., an identifier of the fields and/or associated tags requested by the third device), such that the first device may satisfy the third device's request for the data. In some embodiments, the data management system may include request for a particular cryptographic function (e.g., a symmetric/asymmetric hashing algorithm) for decoding the requested data field.

In some embodiments, the data management system (e.g., using the first device) may request the cryptographic key on a field-by-field basis. For example, the data management system may determine for each data field of the one or more data fields a corresponding decoding cryptographic function of a plurality of decoding cryptographic functions and a corresponding cryptographic key of a plurality of cryptographic keys. The data management system may transmit an identifier request to the second device for a corresponding function identifier associated with each cryptographic function and the corresponding cryptographic key. To illustrate, the data management system, at the second device, may store information associated with cryptographic functions and the associated cryptographic keys used to tokenize the respective field data (e.g., the particular columns or set of columns). The data management system, at the first device, may request identifiers of such information (e.g., identifying the associated cryptographic function, as well as the associated key). An identifier of the cryptographic function may include a label, mathematical relationship, and/or suitable identifier of a cryptographic algorithm associated with decoding and/or encoding tokens for the relevant field data.

In some embodiments, the data management system, at the second device and in response to the request for the cryptographic key, may retrieve a cryptographic key (and/or the associated cryptographic function) for transmission to the first device, in satisfaction of the request. For example, the data management system may determine whether to provide access to the requested field data for the first device based on evaluating the request (e.g., evaluating the credentials of the third entity, for which the first device is acting as a proxy, and/or by evaluating the metadata associated with the tags of the requested data fields). Additionally or alternatively, the data management system may monitor a database associated with regulations, restrictions, or access controls. For example, the data management system, at the remote datacenter, may determine whether the first device is eligible for access to the requested field data by updating, checking, or confirming access controls associated with the data (e.g., to determine whether the first device is still subject to access restrictions relevant to the requested field data). As such, the data management system may determine whether to provide access to sensitive data to the first device in an adaptable, flexible, and dynamic manner, by monitoring for changes in access controls associated with different types of stored data.

In some embodiments, in response to determining to provide access to the requested data (e.g., for the first device), the data management system may transmit a cryptographic key (and/or the associated cryptographic function) to the first device. The first device may receive such information. The data management system may (e.g., at the first device) decode field data within the data field using the cryptographic key (e.g., and/or the associated cryptographic function) into a decoded data field. As an illustrative example, the data management system may determine, on a field-by-field basis, a suitable cryptographic function (e.g., a decoding/mathematically reversible algorithm) and the corresponding key, as received from the second device. For example, the system may provide the associated key and field data to the cryptographic function to recover the decoded version of the encoded data (e.g., including PII information, such as a user's name, birthdate, or other such information), thereby enabling further modification, processing, and/or transmission to other systems (e.g., to satisfy the request by the third device).

The data management system may transmit a response that includes the decoded data. For example, the data management system may transmit a response to the data request that includes the decoded data field. As an illustrative example, the data management system may transmit the decoded columns of sensitive data (e.g., including personal information) to the third device (e.g., a second remote datacenter) in response to the request from the third device. As such, the data management system enables the first device to transmit data to another device (e.g., as a proxy) for data that was initially inaccessible to the first device (e.g., due to access control restrictions). For example, the data management system enables monitoring and updating of regulations and restrictions to determine whether the requested data is accessible by the first device at a time of a request by the first device. Based on such a determination, the data management system enables the first device to access the data and transmit the data or otherwise handle the data, without requiring any large data transfers from or to the remote datacenter (beyond the cryptographic key and/or associated information). As such, the data management system enables the first device to act as a proxy for the third device to access information associated with the second device in an efficient manner.

In some embodiments, the data management system may encode or protect data based on changing regulations (e.g., associated with previously accessible information). For example, the data management system may receive a command to encode a field of the second set of fields not encoded into the corresponding token. The data management system may determine a new cryptographic key for encoding the field of the second set of fields. The data management system may encode value data within the field of the second set of fields into one or more new tokens, wherein the one or more new tokens are decoded based on the new cryptographic key. The data management system may replace the value data with the one or more new tokens. The data management system may transmit a confirmation that the value data has been replaced. As an illustrative example, the data management system may determine that an initially non-sensitive field (e.g., associated with users' income information) is sensitive at a later point in time (e.g., according to dynamically changing regulations). As such, the data management system may, via the second device, transmit a request to the first device to encode such previously unencoded data using a new cryptographic key (e.g., a key associated with encoding data, rather than for decoding data). By doing so, the data management system enables the imposition of dynamic access controls in response to regulation changes, thereby enabling improved flexibility and responsiveness with respect to protecting the privacy and confidentiality of newly sensitive information.

In some embodiments, the data management system may receive the new cryptographic key for encoding the previously unencoded field by requesting the associated key (and/or cryptographic function). For example, the data management system may transmit an encoding request for the new cryptographic key for encoding the field of the second set of fields. In response to the encoding request, the data management system may receive (e.g., at the first device) the new cryptographic key for encoding the field of the second set of fields. The new cryptographic key may correspond to a decoding key for decoding the field of the second set of fields. As an illustrative example, the data management system may request and receive the associated cryptographic key for encoding the data from the second device, which may store a related cryptographic key for decoding the data using the same reversible cryptographic function (e.g., as part as metadata associated with the corresponding data field). By doing so, the data management system enables the first device to tokenize the suitable data in a manner that is accessible to the second device (e.g., the remote datacenter), thereby maintaining the enforcement and access permissions of the remote datacenter.

In some embodiments, the data management system may cause the first device to lose permanent access to data (e.g., by encoding the data using a one-way function). For example, the data management system may receive a command to disable access to a field of the first set of fields encoded into the corresponding token. The data management system may determine a new cryptographic key for encoding the field of the second set of fields, wherein the new cryptographic key is for one way encoding. The data management system may encode value data within the field of the second set of fields into one or more new tokens, wherein the one or more new tokens are unable to be decoded. The data management system may replace the value data within the one or more new tokens. As an illustrative example, the system may disable encoded data (e.g., data that may be recoverable through a cryptographic function and associated key) to non-decodable data (e.g., by applying a cryptographic hash function to the encoded data), thereby removing access to such data indefinitely. By doing so, the data management system enables purging of data by preventing any access of the data by the first device (e.g., even if the first device is in possession of an associated key), for example, in response to changing regulations regarding the particular data.

In some embodiments, the data management system may disable access to the data temporarily or conditionally by erasing a function identifier of the cryptographic function and associated key identifier that enables decoding of a particular data field. For example, the data management system may receive a command to disable access to the first set of fields encoded into the corresponding token representing the corresponding field data. The data management system may erase, for each field within the first set of fields a corresponding function identifier of a cryptographic decoding function and a corresponding key identifier of the cryptographic key. As an illustrative example, by erasing the key and/or cryptographic function associated with decoding a particular data field within the first device, the data management system may ensure the conditional and/or temporary loss of the data (until the associated key and/or function are provided to the first device by another source). By doing so, the data management system confers additional flexibility to system administrators (e.g., associated with the remote datacenter) in providing access to data associated with associated devices.

In some embodiments, the data management system may re-encode the field data with a new cryptographic key (e.g., in order to force the first device to request a new key and/or verify eligibility for access to the data periodically). For example, the data management system may, subsequent to transmitting the response to the request, receive a command to reencode the data field that have been previously decoded. The data management system may receive a new cryptographic key for encoding the data field. The data management system may encode value data within the data field that has been previously decoded into a new token, wherein the new token is enabled to be decoded. The data management system may replace the value data with the new token. As an illustrative example, once the first device has accessed field data that has been decoded, the second device (e.g., the associated remote datacenter) may cause the accessed data to be re-encoded such that any further access to such data would require further validation (e.g., further transmission of an updated cryptographic/decoder key corresponding to the new encoder key). By doing so, the data management system may enable temporary, conditional access to data, while requiring continued access control enforcement for the first device for subsequent access.

In some embodiments, the data management system may use a tokenization service that may tokenize and detokenize specific data. To disable access to the data, the data management system may remove permissions from a particular application and/or a particular computing device to access the tokenization service (e.g., via certificate revocation, application blocking, or via another mechanism.) For example, in order to get access to a particular data field, the data management system may retrieve a token from that field and transmit the token to the tokenization service. The tokenization service may detokenize the token into clear text. Thus, to disable the tokenized data, the data management system may disable access to the tokenization service from an application requesting the detokenization. In some embodiments, the data management system may disable access for a particular uniform resource locator address to the tokenization service.

OTHER EMBODIMENTS

Institutions, governments, and other entities are protective of sensitive data of constituents and citizens in their jurisdictions. Data that is generated in a particular jurisdiction, associated with users in that jurisdiction, or owned or possessed by entities residing in the jurisdiction may include sensitive data. Sensitive data may be data that can be used to identify a person, data that is related to financial or political dealings, data that is private or protected, data that may be used by malicious actors for illicit purposes, or any other data that the jurisdiction or the people in the jurisdiction would like to protect from unauthorized usage.

Some jurisdictions, such as certain countries or states, have typically not allowed sensitive data from that jurisdiction to be stored outside of the jurisdiction because the data may not be controlled or protected sufficiently from malicious actors. These jurisdictions sacrifice flexibility of data management services in favor of providing a more secure level of protection for the data. Other jurisdictions allow data be managed outside of the jurisdiction to allow a greater flexibility of usage, but thereby sacrifice their ability to protect the data.

Conventional systems do not allow a data management system to store and use data outside of a jurisdiction while still allowing the jurisdiction complete control over the usage of such sensitive data.

Example System Architecture

Figure 1:
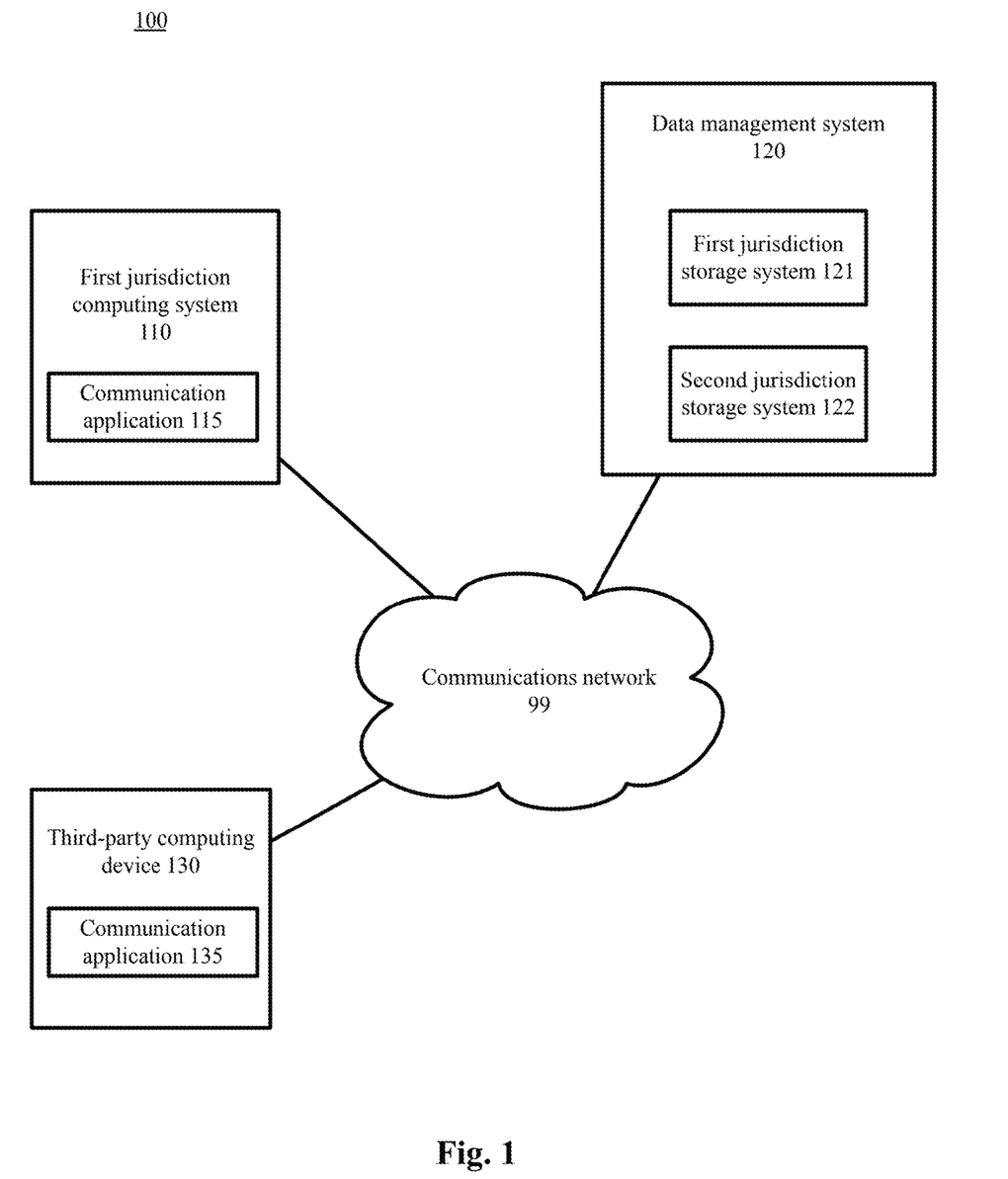
FIG. 1 is a block diagram depicting a system to provide data management security across jurisdictional boundaries using tokenization of sensitive data.

FIG. 1 is a block diagram depicting a system to provide data management security across jurisdictional boundaries using tokenization of sensitive data. As depicted in FIG. 1, the architecture 100 includes a first jurisdiction computing system 110, a data management system 120, and a third-party computing device 130 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing system or device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the first jurisdiction computing system 110 is operated by an end-user, client, client operator, or other user or representative of the first jurisdiction that may use the first jurisdiction computing system 110 to communicate with data management system 120, a third-party computing device 130, or other device to access or provide services or data. While each server, system, and device shown in the architecture is represented by one instance of the server, system, or device, multiple instances of each can be used.

In FIG. 1, the first jurisdiction computing system 110 includes a data storage unit (not shown) accessible by a communication application 115. The communication application 115 on a device of the first jurisdiction computing system 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the data management system 120, a third-party computing device 130, or other device to access services.

The first jurisdiction computing system 110 may be a system of a government or agency of the first jurisdiction. In an example, the first jurisdiction computing system 110 is a system of a data security agency tasked by the jurisdiction to perform functions to secure the data of the people and entities of the first jurisdiction.

The user may use the first jurisdiction computing system 110 to input rules or regulations, approve requests from a third-party system 130, propagate new data tokenization protocols, provide detokenization services, or perform any other actions described in the methods herein.

As shown in FIG. 1, the data management system 120 includes a first jurisdiction storage system 121 located in the first jurisdiction and/or a second jurisdiction storage system 122 located in at least one second jurisdiction. The storage systems 121, 122 are accessible by the data management system 120 or any computing device or system of the data management system 120. The storage systems 121, 122 may manage or store databases or other types of data storage formats. The second jurisdiction storage system 122 may include storage devices or systems in a single second jurisdiction or in any other number of jurisdictions.

The data management system 120 represents any device, computing system, organization, cloud computing system, or other device or system that is suitable to manage data for clients, institutions, governments, businesses, users, or any other entities. The data may be stored, distributed, assessed, received, processed, analyzed, or otherwise managed by the data management system 120. The data management system 120 may perform the methods described herein to protect the security and confidentiality of any data provided by the first jurisdiction computing system 110. The data management system 120 may perform the methods described herein in one or more locations within or outside of the first jurisdiction. For example, the data management system 120 may store data on a storage device located in the first jurisdiction and also on a storage device located in a second jurisdiction.

In FIG. 1, the third-party computing device 130 includes a data storage unit (not shown) accessible by a communication application 135. The third-party computing device 130 may represent a device, a server, a network, or any other device or system that performs any actions using data stored in the data management system 120. The communication application 135 on the third-party computing device 130 may be, for example, a web browser application or a stand-alone application, to view, download, upload, or otherwise access documents, user interfaces, or web pages via the networks 99. The communication application 135 can interact with web servers or other computing devices connected to the network 99, such as by conducting and authorizing an interaction with the data management system 120, first jurisdiction computing system 110, or other device to access and use data. An operator of the third-party computing device 130 may use the data for any suitable purpose, such as managing an account, processing transactions, or allowing access.

Figure 5:
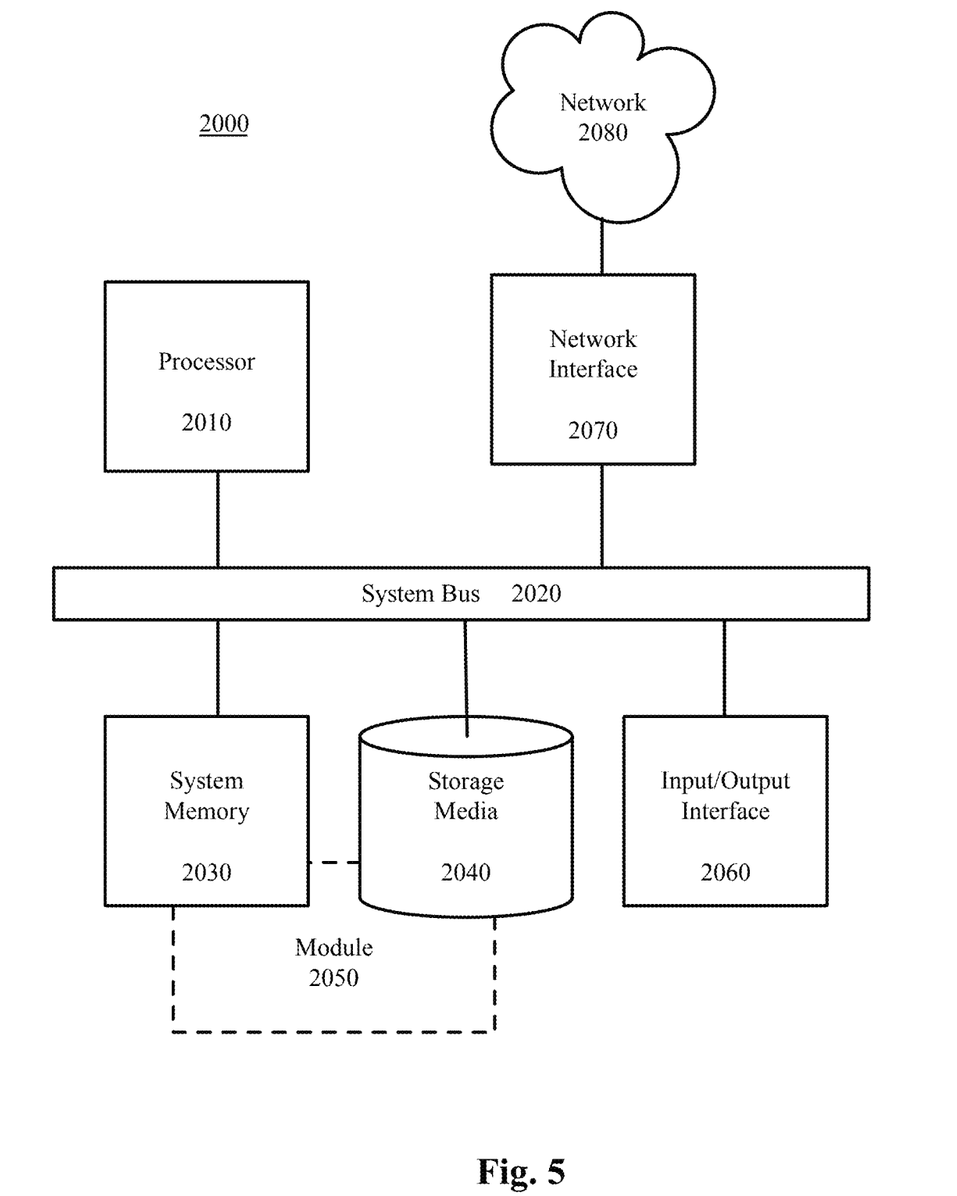
FIG. 5 depicts a computing machine and a module.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as network 99. The network 99 may include any type of data or communications network, including any of the network technology discussed with respect to FIG. 5.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology provides methods and systems to allow global usage of data while allowing regional jurisdictions control over such sensitive data. Different jurisdictions, such as a nation or a state, may declare types of data from that jurisdiction as sensitive data and that the sensitive data is not to be discoverable by a third party. For example, a jurisdiction may declare that personally identifiable information ("PII") associated with a person living in that jurisdiction is sensitive.

A global data management system stores data in many different jurisdictions to allow for businesses, institutions, and users to use the data in the global economy. When a certain jurisdiction does not allow sensitive data to be stored outside of the jurisdiction of the data's owner, the data may not be as useful as users perform actions outside of the jurisdiction. The global data management needs a method of storing and using the data outside of the jurisdiction while still allowing the jurisdiction control over the sensitive data.

The data management system provides a system that allows the data to be shared across jurisdiction boundaries with complete auditability, traceability, and compliance. The data management system provides a system that allows a first jurisdiction computing device to control the usage of the data. The software communication technologies allow the first jurisdiction computing device to propagate rules, tokenization protocols, and updates to the data management system to manage the sensitive data. In certain examples, functions described herein may be performed by either the data management system or the first jurisdiction computing device. In certain examples, the first jurisdiction computing device communicates instructions for actions to be taken by the data management system.

The data management system or a first jurisdiction computing device determines a type or category of each instance of data to be stored and used. The data management system or a first jurisdiction computing device identifies any data that is designated as sensitive by the first jurisdiction providing the data. The data management system or a first jurisdiction computing device then tokenizes any sensitive data before transferring the data outside of the first jurisdiction.

After receiving the data outside of the first jurisdiction, the data management system or a first jurisdiction computing device controls which third party or other system is permitted to access the sensitive data. The data management system or a first jurisdiction computing device detokenizes the data when the data is to be used for an approved purpose by an approved party. If the first jurisdiction has a change in permissions for sensitive data, the jurisdiction can propagate a tokenization to all data stored in the data management system outside of the jurisdiction. For example, the jurisdiction can change the permissions to prevent detokenization of a particular data field or for a particular third party. Further, data that is not currently tokenized may be subsequently tokenized when directed by the first jurisdiction.

The data management system thus allows a first jurisdiction complete control over data from that first jurisdiction despite the data being stored and used outside of the first jurisdiction. The globalization of data process acknowledges the complexities of the regional business processes, regulatory requirements, and vast array of products to produce a harmonized and unified global data source. The system provides real-time data synchronization capabilities.

The system provides that data stored and communicated across jurisdictions follows a very rigorous process of reviews, control checks, and conservatively tokenizes the sensitive data across all jurisdictions. The system provides an end-to-end view of user accounts and activities regardless of the geographic location of the activities. Further, by allowing data management systems to operate across territorial and jurisdictional boundaries, confusion between account data storage processors is avoided. That is, with a single data management system, user accounts are not stored by different entities in each different jurisdiction, and the single system is able to more efficiently manage the data.

The examples for embodiments of the invention may employ computer hardware and software, including, without limitation, one or more processors coupled to memory and non-transitory computer-readable storage media with one or more executable computer application programs stored thereon, which instruct the processors to perform such methods.

Figure 2:
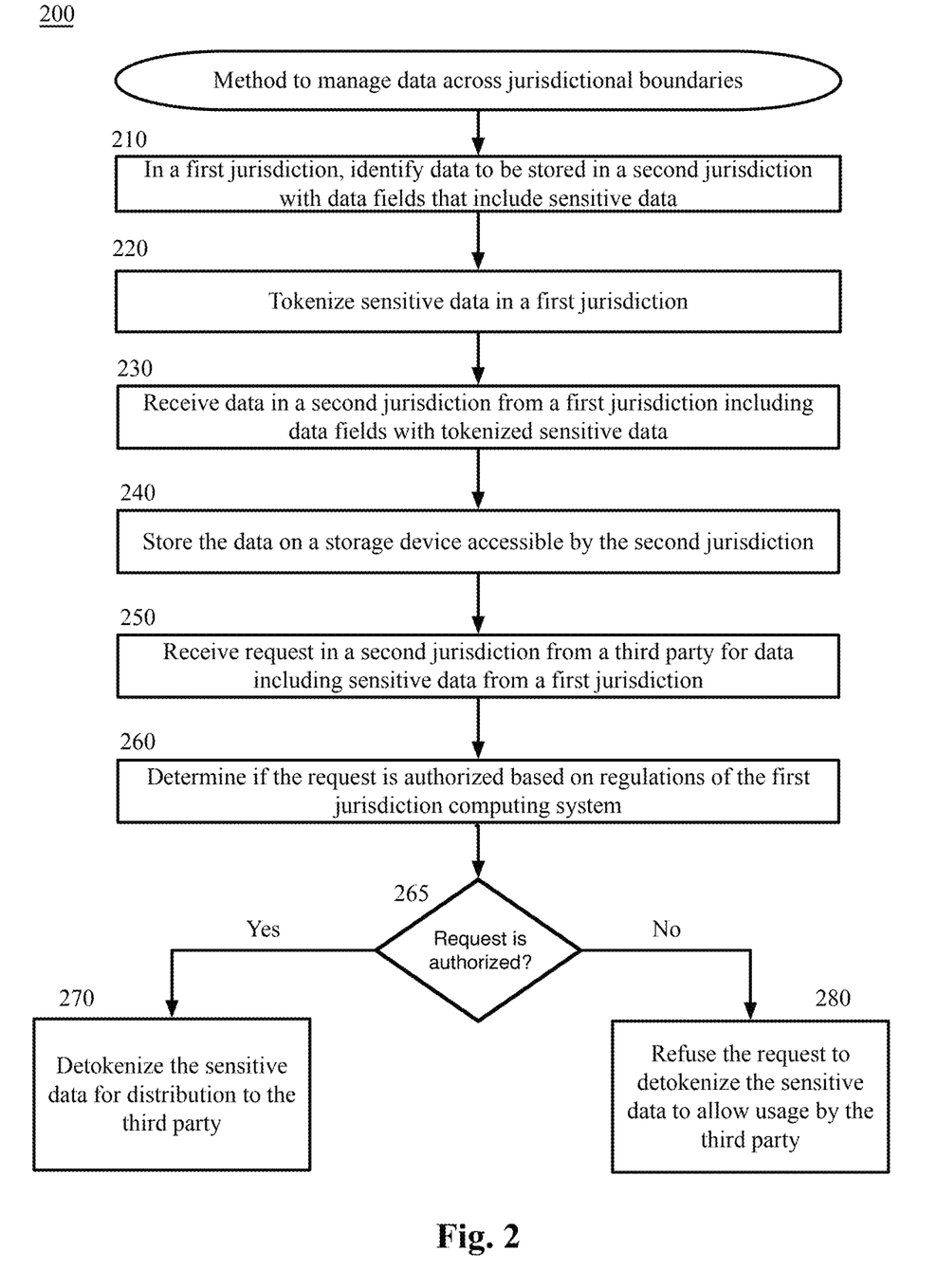
FIG. 2 is a block flow diagram depicting a method to provide data management security across jurisdictional boundaries using tokenization of sensitive data.
Figure 3:
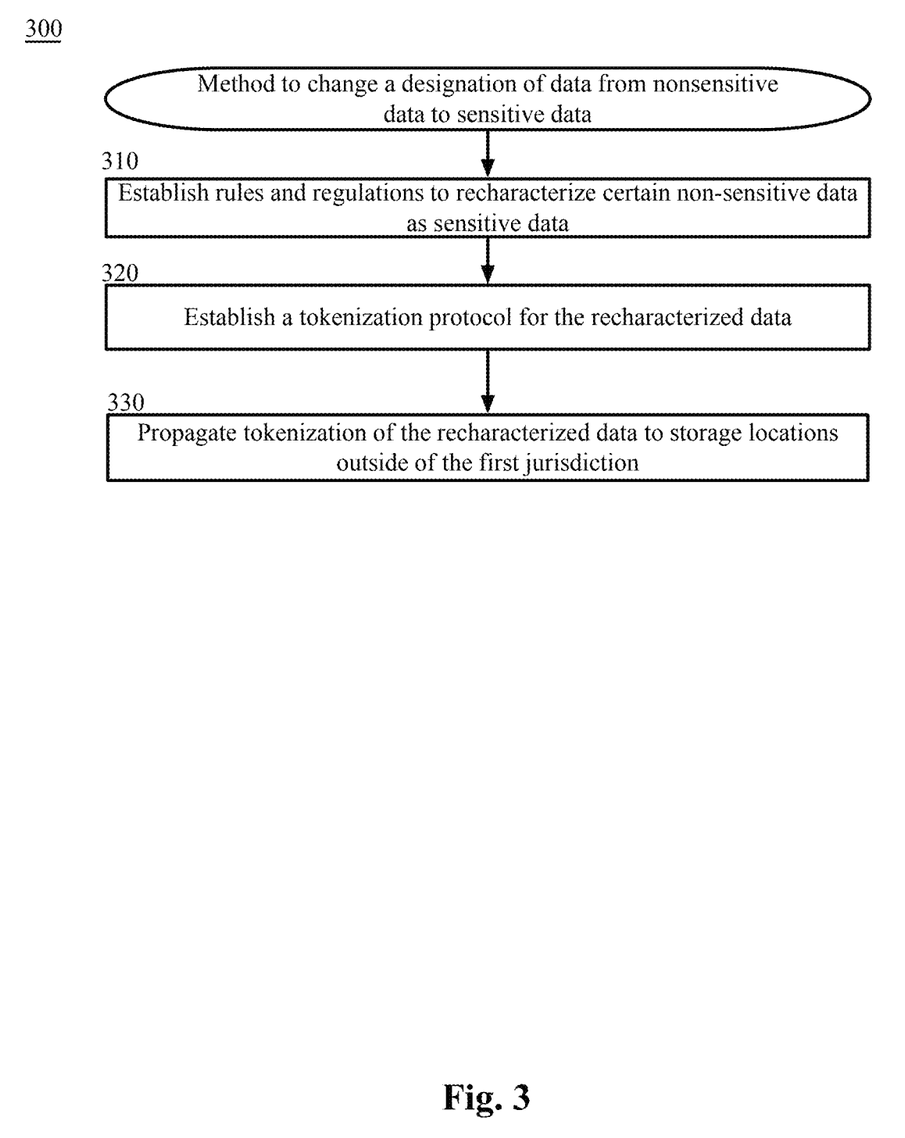
FIG. 3 block flow diagram depicting a method to change a designation of data from non-sensitive data to sensitive data.

The example methods illustrated in FIGS. 2-3 are described hereinafter with respect to the components of the example communications and processing architecture 100.

FIG. 2 is a block flow diagram depicting a method to provide data management security across jurisdictional boundaries using tokenization of sensitive data.

In block 210, the first jurisdiction computing system 110 identifies data to be stored in a second jurisdiction with data fields that include sensitive data. Different jurisdictions, such as a nation or a state, may declare different types of data from that jurisdiction as sensitive data that is not to be discoverable by a third party without express permission. For example, a jurisdiction may declare that personally identifiable information ("PII") associated with a person living in that jurisdiction is sensitive, such as phone numbers, addresses, or names. In another example, all financial information of entities residing in a country are considered sensitive. In another example, data related to national security interests are considered sensitive. In another example, certain demographic data about a person in the jurisdiction is considered to be sensitive, such as age, race, marital status, or any other demographic data.

In an example, the data of an entity in the first jurisdiction may be used to perform business operations in a second jurisdiction. For example, a company headquartered a first country may have customers and operations in the first country, but also operations and customers in other countries. If a customer of the entity in the first country requires services of the entity that is performed in a second country, the operations in the second country will require potentially sensitive data of that customer, such as an email address to use to deliver a product.

The data may be selected for storage or usage in the second jurisdiction by the entity in the first jurisdiction. The entity may be obligated by law or regulation to treat certain data as sensitive. In another example, the entity is obligated by corporate policy or other policy to treat certain data as sensitive. The data may be analyzed, examined, or otherwise processed to determine if any sensitive data is included in one or more data fields of the data selected for transfer out of the first jurisdiction. The processing of the data may be performed by a system within the entity, such as an algorithm or other computing function that identifies sensitive data within the set of data. In another example, the processing of the data may be performed by a function of the first jurisdiction computing system 110.

In another example, the processing of the data may be performed by the data management system 120. For example, the data management system 120 may receive the data in the first jurisdiction and desire to transfer the data out of the first jurisdiction for storage and use. The data management system 120 would analyze the data before the transfer to identify sensitive data.

The sensitive data is identified in one or more data fields of the data to be transferred and noted as such. The data is filtered for content, identifiers, metadata, or any other data characteristic that identifies the data as sensitive. When sensitive data is recognized based on one of the features, content, or characteristics, the data is labeled, segregated, flagged, or otherwise characterized as sensitive data. The existence of the sensitive data and the storage location of the sensitive data is logged and stored to allow traceability of the sensitive data. If a leak of the sensitive data occurs, the route of communication and storage of the data may be identified to identify a source of the disclosure.

In block 220, the sensitive data is tokenized in a first jurisdiction. The data is tokenized such that only a user of the data with access to a detokenization protocol is able to read, copy, modify, or otherwise use the data. The process of tokenizing data includes substituting sensitive data with equivalent non-sensitive data. The non-sensitive, replacement data is called a token. Tokens can be created by one of multiple tokenization processes. For example, a token may be created via a mathematically reversible cryptographic function with a key. In another example, a token may be created using a nonreversible function, such as a hash function. In another example, a token may be created using an index function or randomly generated number. Other tokenization processes may be used. When a tokenized data item is seen by a third-party, the token, non-sensitive data is the only data that is exposed. In an example, the sensitive information that the token represents is stored safely in a centralized server or other storage location known as a token vault. The holder of the token vault is the only entity that is able to map the token back to the original sensitive data.

When the first jurisdiction computing system 110 tokenizes the data or controls the tokenization of the data, the first jurisdiction computing system 110 maintains control over what entities or users may access the data.

In block 230, the data management system 120 receives data in a second jurisdiction from a first jurisdiction including data fields with tokenized sensitive data. After tokenizing the sensitive data, the first jurisdiction computing system 110 transfers the data without a fear of the sensitive data being seen by unauthorized observers. In another example, the data is transferred to the data management system 120 before the tokenization process with the assurance that the data management system 120 will tokenize the data upon receipt. The data management system 120 may be obligated to tokenize the data by statute, regulation, contract, agreement, or any other binding mechanism.

In block 240, the data management system 120 stores the data on a second jurisdiction storage system 122 accessible by the second jurisdiction. The data may be stored in any location agreed to by the first jurisdiction. The data may be stored in the second location, in the first location, in a cloud computing environment, or any other suitable location.

In an example, the data is stored in a database on a second jurisdiction storage system 122, on a first jurisdiction storage system 121, or both. The data may be stored as raw data, sorted data, filtered data, or using any other type of data storage process.

In block 250, the data management system 120 receives in a second jurisdiction a request from a third party for data including sensitive data from a first jurisdiction. In the example, a third-party computing device 130 communicates a request to the data management system 120 for data of an entity from inside the first jurisdiction.

In a continuing example, the third party is an entity that is conducting a transaction with an entity from the first jurisdiction. The third party is an organization that is located in the second jurisdiction. The third party requires sensitive banking data for the transacting entity to conduct the transaction. The third party computing device 130 submits a request to the data management system 120 for the required banking data. The request includes a request for data that is flagged as sensitive and is tokenized.

In block 260, the data management system 120 determines if the request is authorized based on regulations of the first jurisdiction computing system 110. The data management system 120 determines that at least one of the data fields of the requested data is tokenized. For example, the data management system 120 may recognize flagged data, data in a file noted as sensitive, or recognize that the data in the file is tokenized.

In response to recognizing that the request includes a request for tokenized data, the data management system 120 determines if the third party that requested the data is authorized to receive detokenized data. In certain examples, the data management system 120 may consult a list of authorized users and compare the request to a database that specifies data that may be shared with certain requesters. The data management system 120 may consult with the first jurisdiction computing system 110 to request authorization regarding the third party. The data management system 120 may request an authorization code or verification from the third-party computing device 130. In any other suitable manner, the data management system 120 may verify if the third party may receive detokenized data.

In block 265, if the data management system 120 determines that the request is authorized, then the method 200 proceeds to block 270. If the data management system 120 determines that the request is not authorized, then the method 200 proceeds to block 280.

Following the Yes path from block 265, in block 270, the data management system 120 detokenizes the sensitive data for distribution to the third party. If the third party is determined to be authorized to receive the detokenized data, the data management system 120 may perform any suitable method to provide the detokenized data to the third-party computing device 130. In an example, the data management system 120 detokenizes the data with a detokenization protocol provided by the first jurisdiction computing system 110, such as by comparing the data to a key provided by the first jurisdiction computing system 110.

In another example, the data management system 120 provides a request to the first jurisdiction computing system 110 to provide a randomly generated number associated with the tokenization to allow detokenization. In another example, a detokenization key is provided to the third-party computing device 130 to allow the third-party computing device 130 to detokenize the data. Any other suitable process may be used.

Following the No path from block 265, in block 280, the first jurisdiction computing system 110 or the data management system 120 refuses the request to detokenize the sensitive data to allow usage by the third-party computing device 130. When the request is denied, the third party is not allowed to receive the sensitive data. Upon the denial, the data management system 120 does not detokenize the data for the third-party computing device 130. The data may be withheld from the third-party computing device 130 or the data may still be transmitted, but the data is transmitted while still tokenized. The third-party computing device 130 is incapable of detokenizing or otherwise understanding the tokenized data. In examples in which the detokenization is performed by the first jurisdiction computing system 110, the first jurisdiction computing system 110 refuses the request to detokenize.

The third party may receive a notification from the data management system 120 or the first jurisdiction computing system 110 that the request is denied. The notification may include an explanation for the denial or instructions to appeal the denial.

FIG. 3 block flow diagram depicting a method 300 to change a designation of data from non-sensitive data to sensitive data.

In block 310, the first jurisdiction computing system 110 establishes rules and regulations to recharacterize certain non-sensitive data as sensitive data. In an example, a government entity in the first jurisdiction creates a new regulation that a certain type of personally identifiable information ("PII"), such as birthdate of a user living in the first jurisdiction, is now classified as sensitive information. In the example, the birthdate was not previously sensitive information. The birthdate was previously distributed to the data management system 120 out of the first jurisdiction and was stored without being tokenized. Third party requests for the birthdate of the user were previously granted.

Based upon the new regulations, the birthdate should be identified as sensitive and should not be distributed to third parties. However, the birthdate is still being stored on the data management system 120 without being tokenized for data sets transmitted before the regulation.

Any other example of a change of non-sensitive data to sensitive data may be performed in the first jurisdiction. The change may be for any suitable reason, such as a new law, a new banking regulation, a new government agency regulation, or for any other reason.

In block 320, the first jurisdiction computing system 110 establishes a tokenization protocol for the recharacterized data. The first jurisdiction computing system 110 may perform any process to tokenize the newly sensitive data. For example, the first jurisdiction computing system 110 may create a mathematically reversible cryptographic function with a key for each instance of the recharacterized data. Any other tokenization process may be used.

In block 330, the first jurisdiction computing system 110 propagates a tokenization of the recharacterized data to storage locations outside of the first jurisdiction. The first jurisdiction computing system 110 maintains control over the tokenization process even though the data is stored on a second jurisdiction storage system 122. The sensitive data is accessed in the second jurisdiction storage system 122, tokenized, and restored. The first jurisdiction computing system 110 is provided with complete control over the tokenization process.

In another example, the first jurisdiction computing system 110 propagates instructions to the data management system 120 to tokenize the recharacterized data. In the example, the data management system 120 performs the tokenization based on the instructions of the first jurisdiction computing system 110. The first jurisdiction computing system 110 may provide the tokenization protocol for the data management system 120 system to employ.

The recharacterized sensitive data stored in the second jurisdiction storage system 122 is now tokenized and unusable by a non-authorized user or third party. The first jurisdiction has maintained control over the data even though the data was stored outside of the first jurisdiction.

Figure 4:
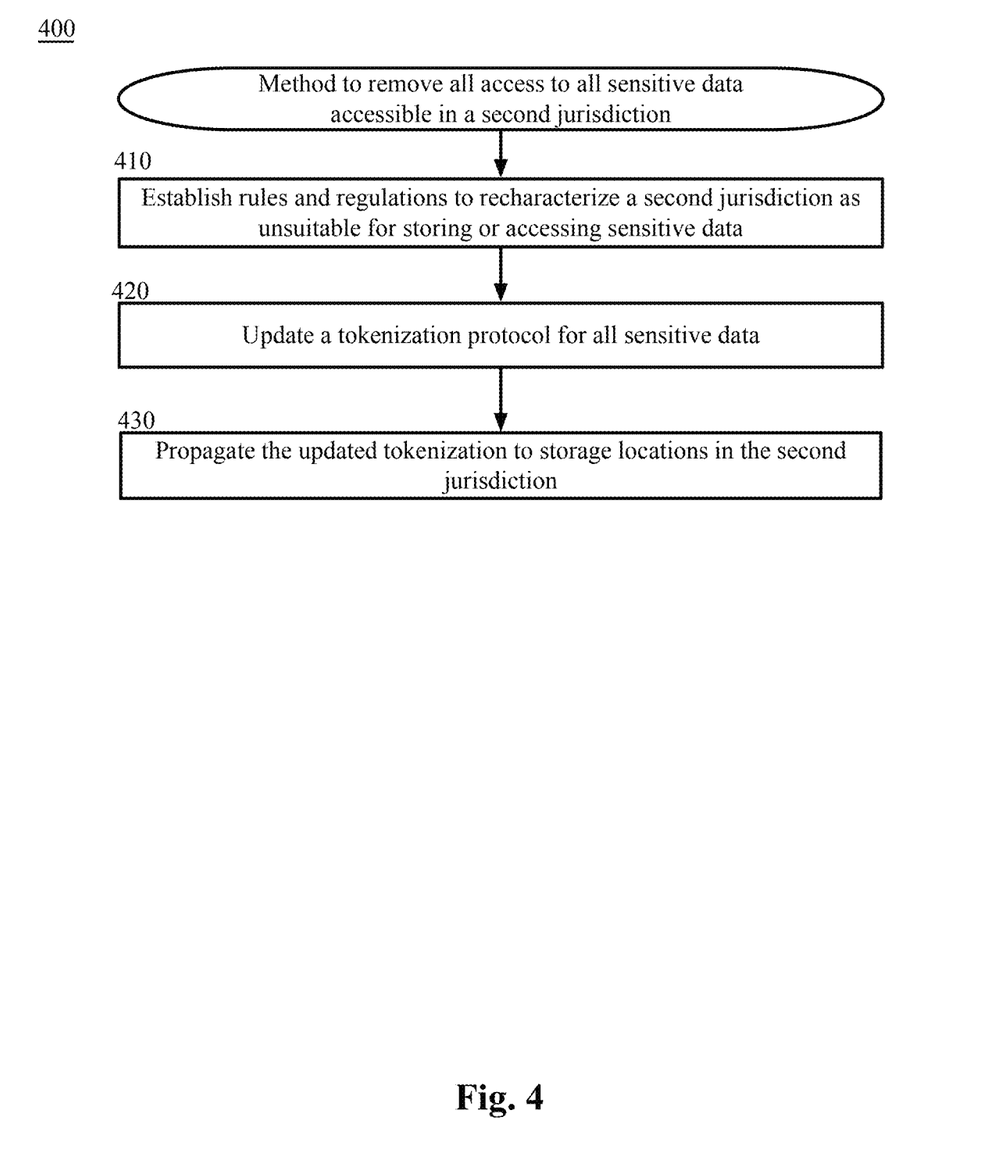
FIG. 4 block flow diagram depicting a method to remove access to all sensitive data in a second jurisdiction.

FIG. 4 block flow diagram depicting a method 400 to remove access to all sensitive data accessible in a second jurisdiction.

In block 410, the first jurisdiction computing system 110 establishes rules and regulations to recharacterize a second jurisdiction as unsuitable for storing or accessing sensitive data. In an example, a government entity in the first jurisdiction creates a new regulation that a certain jurisdiction, such as a nation or a state, is now classified as a jurisdiction that is not allowed to have access to sensitive information or store sensitive information.

In the example, the second jurisdiction was previously allowed to store data as described in the method 200 herein. Based upon the new regulations, the jurisdiction is now banned by the first jurisdiction from storing sensitive data. For example, the second jurisdiction may have had a change of leadership, a change in banking regulations, an increase in financial crimes, or for any other reason become a higher risk jurisdiction.

In block 420, the first jurisdiction computing system 110 updates a tokenization protocol for all sensitive data. The first jurisdiction computing system 110 may perform any process to tokenize the data. For example, the first jurisdiction computing system 110 may create a mathematically reversible cryptographic function with a key for each instance of the recharacterized data. Any other tokenization process may be used. Even if the data was previously tokenized, the updated tokenization uses a new tokenization protocol to which the second jurisdiction does not have access.

In block 430, the first jurisdiction computing system 110 propagates the updated tokenization to storage locations in the second jurisdiction. The first jurisdiction computing system 110 maintains control over the tokenization process even though the data is stored on a second jurisdiction storage system 122. The sensitive data is accessed in the second jurisdiction storage system 122, retokenized, and restored. The first jurisdiction computing system 110 is provided with complete control over the tokenization process. The data management system 120 and any third parties located in the second jurisdiction are now unable to detokenize the sensitive data and the data is unusable.

In another example, the first jurisdiction computing system 110 propagates instructions to the data management system 120 to retokenize the recharacterized data. In the example, the data management system 120 performs the tokenization based on the updated instructions of the first jurisdiction computing system 110. The first jurisdiction computing system 110 may provide the updated tokenization protocol for the data management system 120 system to employ.

The sensitive data stored in the second jurisdiction storage system 122 is now tokenized and unusable by a non-authorized user or third party. The first jurisdiction has maintained control over the data even though the data was stored outside of the first jurisdiction.

Example Systems

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system for providing data protection, the system comprising:
   one or more processors; and
   a non-transitory, computer-readable storage medium storing instructions, which, when executed by the one or more processors cause the one or more processors to:
      receive data at a first device located in a first datacenter in a first jurisdiction from a second device located in a second datacenter in a second jurisdiction, wherein the data comprises a plurality of data fields, and wherein the plurality of data fields comprises a first set of fields encrypted into a corresponding token representing corresponding field data and a second set of fields not encrypted into the corresponding token, and wherein the first set of fields comprises sensitive data to be controlled by the second device in the second jurisdiction;
      store the data in the first jurisdiction;
      receive, at the first device from a third device, a data request, wherein the data request comprises a request for one or more data fields from the first set of fields encrypted into the corresponding token;
      in response to receiving the data request from the third device, request by the first device, from the second device, a cryptographic key for decrypting the one or more data fields;
      upon receiving the cryptographic key from the second jurisdiction, decrypt by the first device, using the cryptographic key, field data within the one or more data fields to obtain one or more decrypted data fields;
      transmit, by the first device, to the third device, a response to the data request comprising the one or more decrypted data fields;
      based on a rule change within the second jurisdiction, receive, by the first device from the second jurisdiction, a command to disable access to the first set of fields encrypted into the corresponding token representing the corresponding field data; and
      in response to receiving the command, erase, by the first device, each corresponding token representing the corresponding field data stored in the first jurisdiction, restricting the first jurisdiction rom storing the sensitive data.

2. The system of claim 1, wherein the instructions further cause the one or more processors to:
   based on a new rule change within the second jurisdiction, receive, by the first device from the second device, an instruction to encrypt a field of the second set of fields into the corresponding token, wherein the field that has not been designated sensitive previously and has now been designated as sensitive;

encrypt, by the first device, value data within the field of the second set of fields into one or more new tokens, wherein the one or more new tokens are decrypted using a different cryptographic function and a different cryptographic key; and replace, by the first device, the value data within the field with the one or more new tokens.

3. The system of claim 2, wherein the instructions further cause the one or more processors to:

receive, from the second jurisdiction, a new cryptographic key for encrypting the field of the second set of fields; and subsequent to replacing the value data, transmit, by the first device, a confirmation to the second device, wherein the different cryptographic function and the different cryptographic key are not stored at the first device.

4. The system of claim 3, wherein the instructions for determining the new cryptographic key for encrypting the field of the second set of fields further causes the one or more processors to:

transmit, by the first device, an encryption request to the second device for the new cryptographic key for encrypting the field of the second set of fields; and in response to the encryption request, receive, by the first device, the new cryptographic key for encrypting the field of the second set of fields, wherein the new cryptographic key corresponds to a decryption key for decrypting the field of the second set of fields.

5. The system of claim 1, wherein the instructions further cause the one or more processors to:

subsequent to transmitting the response to the data request, receive, by the first device, from the second device, a new command to re-encrypt the one or more decrypted data fields;

receive, by the first device and from the second jurisdiction, a new cryptographic function and a new cryptographic key for re-encrypting the one or more decrypted data fields;

re-encrypt, by the first device, value data within the one or more decrypted data fields into new tokens, wherein the new tokens are enabled to be decrypted using the new cryptographic function and the new cryptographic key; and replace the value data within the one or more decrypted data fields with the new tokens.

6. The system of claim 1, wherein the instructions for requesting by the first device, from the second device based on each data field of the one or more data fields, the cryptographic key further cause the one or more processors to determine for each data field of the one or more data fields a corresponding cryptographic key of a plurality of cryptographic keys.

7. A method for providing data protection, the method comprising:

receiving data at a first device located in a first datacenter in a first jurisdiction from a second device located in a second datacenter in a second jurisdiction, wherein the data comprises a plurality of data fields, and wherein the plurality of data fields comprises a first set of fields encrypted into a corresponding token representing corresponding field data and a second set of fields not encrypted into the corresponding token, and wherein the first set of fields comprises sensitive data to be controlled by the second device in the second jurisdiction;

storing the data in the first jurisdiction;

receiving, at the first device from a third device, a data request, wherein the data request comprises a request for one or more data fields from the first set of fields encrypted into the corresponding token;

in response to receiving the data request from the third device, requesting, by the first device from the second device, a cryptographic key for decrypting the one or more data fields;

upon receiving the cryptographic key, decrypting by the first device, field data within the one or more data fields using the cryptographic key to obtain one or more decrypted data fields;

transmitting, by the first device to the third device, a response to the data request comprising the one or more decrypted data fields;

based on a rule change within the second jurisdiction, receiving, by the first device from the second jurisdiction, a command to disable access to the first set of fields encrypted into the corresponding token representing the corresponding field data; and in response to receiving the command, disabling, by the first device, each corresponding token representing the corresponding field data stored in the first jurisdiction, restricting the first jurisdiction from storing the sensitive data.

8. The method of claim 7, further comprising:

based on a new rule change within the second jurisdiction, receiving, by the first device from the second device, an instruction to encrypt a field of the second set of fields into the corresponding token, wherein the field that has not been designated sensitive previously and has now been designated as sensitive;

encrypting, by the first device, value data within the field of the second set of fields into one or more new tokens, wherein the one or more new tokens are decrypted using a different cryptographic function and a different cryptographic key; and replacing, by the first device, the value data within the field with the one or more new tokens.

9. The method of claim 8, further comprising:

receiving, from the second jurisdiction, a new cryptographic key for encrypting the field of the second set of fields; and subsequent to replacing the value data, transmitting, by the first device to the second jurisdiction, a confirmation that the value data has been replaced.

10. The method of claim 9, wherein the determining the new cryptographic key for encrypting the field of the second set of fields further comprises:

transmitting, by the first device, an encryption request to the second device for the new cryptographic key for encrypting the field of the second set of fields; and in response to the encryption request, receiving, by the first device, the new cryptographic key for encrypting the field of the second set of fields, wherein the new cryptographic key corresponds to a decryption key for decrypting the field of the second set of fields.

11. The method of claim 7, further comprising:

subsequent to the transmitting the response to the data request, receiving, by the first device, a new command to re-encrypt the one or more decrypted data fields;

receiving, by the first device from the second jurisdiction, a new cryptographic key for re-encrypting the one or more decrypted data fields;

re-encrypting value data within the one or more decrypted data fields into a plurality of new tokens, wherein the plurality of new tokens comprises tokens that are enabled to be decrypted using another cryptographic key that corresponds to the new cryptographic key; and replacing value data within the one or more decrypted data fields with the plurality of new tokens.

12. The method of claim 7, wherein the requesting, based on each data field of the one or more data fields, the cryptographic key further comprises:

receiving, from the second jurisdiction, for each data field of the one or more data fields a corresponding cryptographic key of a plurality of cryptographic keys; and transmitting, by the first device, a key request for each corresponding cryptographic key.

13. One or more non-transitory, computer-readable media storing instructions that when executed by one or more processors perform operations comprising:

receiving data at a first device located in a first datacenter in a first jurisdiction from a second device located in a second datacenter in a second jurisdiction, wherein the data comprises a plurality of data fields, and wherein the plurality of data fields comprises a first set of fields encrypted into a corresponding token representing corresponding field data and a second set of fields not encrypted into the corresponding token, and wherein the first set of fields comprises sensitive data to be controlled by the second device in the second jurisdiction;

receiving, at the first device from a third device, a data request, wherein the data request comprises a request for one or more data fields from the first set of fields encrypted into the corresponding token;

in response to receiving the data request from the third device, requesting, by the first device from the second device, a cryptographic key for decrypting the one or more data fields;

upon receiving the cryptographic key from the second jurisdiction, decrypting by the first device, field data within the one or more data fields using the cryptographic key to obtain one or more decrypted data fields;

transmitting, by the first device to the third device, a response to the data request comprising the one or more decrypted data fields;

based on a rule change within the second jurisdiction, receiving, by the first device, a command to disable access to the first set of fields encrypted into the corresponding token representing the corresponding field data; and in response to the receiving the command, disabling, by the first device, each corresponding token representing the corresponding field data stored at the first jurisdiction, restricting the first jurisdiction from storing the sensitive data.

14. The one or more non-transitory, computer-readable media of claim 13, wherein the instructions further cause the one or more processors to perform operations comprising:

based on a new rule change within the second jurisdiction, receiving, by the first device from the second device, an instruction to encrypt a field of the second set of fields into the corresponding token, wherein the field that has not been designated sensitive previously and has now been designated as sensitive;

encrypting, by the first device, value data within the field of the second set of fields into one or more new tokens, wherein the one or more new tokens are decrypted using a different cryptographic function and a different cryptographic key; and replacing, by the first device, the value data within the field with the one or more new tokens.

15. The one or more non-transitory, computer-readable media of claim 14, wherein the instructions further cause the one or more processors to perform operations comprising:

receiving, from the second jurisdiction, a new cryptographic key for encrypting the field of the second set of fields; and subsequent to the replacing the value data, transmitting, by the first device to the second jurisdiction, a confirmation that the value data has been replaced.

16. The one or more non-transitory, computer-readable media of claim 15, wherein the instructions for the determining the new cryptographic key for encrypting the field of the second set of fields further cause the one or more processors to perform operations comprising:

transmitting, by the first device, an encrypting request for the new cryptographic key for encrypting the field of the second set of fields; and in response to the encrypting request, receiving, by the first device, the new cryptographic key for encrypting the field of the second set of fields, wherein the new cryptographic key corresponds to a decryption key for decrypting the field of the second set of fields.

17. The one or more non-transitory, computer-readable media of claim 13, wherein the instructions further cause the one or more processors to perform operations comprising:

receiving, by the first device from the second jurisdiction, a new command to disable access to a field of the first set of fields encrypted into the corresponding token; and transmitting, by the first device, to a detokenization service one or more instructions to disable application access to the detokenization service, wherein the one or more instructions comprise an application identifier associated with an application that requests detokenization of the field.

18. The one or more non-transitory, computer-readable media of claim 13, wherein the instructions further cause the one or more processors to perform operation comprising:

receiving, by the first device from the second jurisdiction a new command to disable access to the first set of fields encrypted into the corresponding token representing the corresponding field data, wherein the first set of fields corresponds to parameters associated with a user; and erasing, by the first device, for each field within the first set of fields a corresponding function identifier of a cryptographic decrypting function and a corresponding key identifier of the cryptographic key.

* * * * *